United States Patent [19]

Thirion

[11] 4,351,820

[45] Sep. 28, 1982

[54] REGENERATION OF CHEMICAL RECONVERSION CATALYSTS USED IN A CYCLIC PROCESS FOR THE PRODUCTION OF HYDROGEN PEROXIDE AND APPARATUS THEREFOR

[75] Inventor: Pierre Thirion, Sassenage, France

[73] Assignee: Oxysynthese, Paris, France

[21] Appl. No.: 176,643

[22] Filed: Aug. 11, 1980

[30] Foreign Application Priority Data

Sep. 6, 1979 [FR] France ............................. 79 22266

[51] Int. Cl.³ ...................... C01B 15/023; B01J 21/21
[52] U.S. Cl. .................................. 423/588; 252/416; 252/418
[58] Field of Search ............... 252/416, 418, 419, 414; 423/588

[56] References Cited

U.S. PATENT DOCUMENTS 3,424,696  1/1969  Coingt .
3,814,701  6/1974  Browning .
3,993,590  11/1976  Andre et al. ..................... 252/455 R

FOREIGN PATENT DOCUMENTS 1340901   9/1963  France .
2195590   8/1974  France .
54-107495 8/1979  Japan ................................. 252/44.5
1047259   11/1966 United Kingdom ................ 252/414

Primary Examiner—P. E Konopka
Attorney, Agent, or Firm—Browdy and Neimark

[57] ABSTRACT

A process is disclosed for the regeneration, by thermal treatment, of used catalysts for a cyclical process for the production of hydrogen peroxide. According to the process, used aluminosilicate type catalyst is subjected to progressive heating up to a temperature between 700° and 850° C., in the presence of an oxidizing atmosphere circulating co-current to the catalyst being regenerated. The process can be carried out in a rotary furnace inclined to the horizontal by 0.7 to 1% and having radial fins on the lower section of its inner wall, and an adjustable diaphragm at its outlet.

9 Claims, 1 Drawing Figure

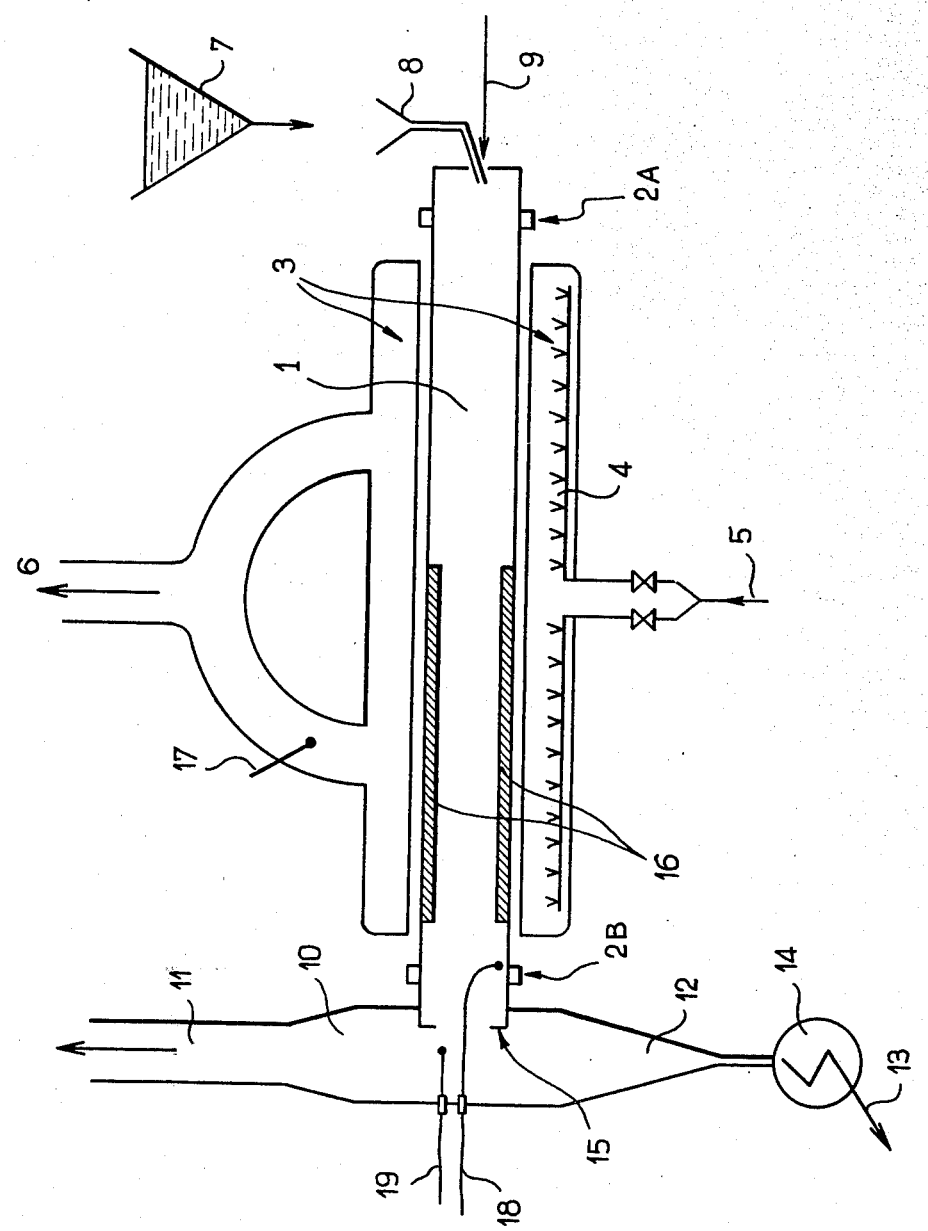

REGENERATION OF CHEMICAL RECONVERSION CATALYSTS USED IN A CYCLIC PROCESS FOR THE PRODUCTION OF HYDROGEN PEROXIDE AND APPARATUS THEREFOR

BACKGROUND OF THE INVENTION

The present invention concerns a process for the regeneration of chemical conversion catalysts used in a cyclic process for the production of hydrogen peroxide.

It is well known that the production of hydrogen peroxide using quinones is a cyclic process, whereby a quinone is dissolved in an organic solvent, hydrogenated to hydroquinone, and then oxidized by air or oxygen into quinone hydroperoxide. This, on contact with water, provides an aqueous solution of hydrogen peroxide and an organic solution containing regenerated quinone. The solution which goes through the hydrogenation-oxidation-extraction cycle is called the work solution. The quinones used are generally alkylated anthraquinones and particularly the 2-alkyl anthraquinones.

In the hydrogen peroxide production cycle, undesirable secondary reactions occur in addition to the principal reactions, and result in degradation of the quinone and the solvents used.

Because of (a) the high cost of substituted anthraquinones and (b) the generally prejudicial effect of the accumulation of products detrimental to the properties of the work solution, it is necessary to treat the work solution so as to prevent its deterioration, or at least to keep its degradation to a minimum. The secondary reactions are normally reversible; it is possible to reverse the reaction direction by modifying the conditions of the reaction medium. One widely used technique consists of treating the work solution at a relatively high temperature (80° to 200° C.) on a solid catalyst; this is preferably carried out on a branch of the main circuit, called the conversion circuit.

The conversion catalysts are generally neutral or slightly alkaline microporous solids; these are often aluminas of various structures, but the gels of alkaline aluminosilicates are also widely used and are becoming increasingly important.

When a catalytic mass is installed in a conversion circuit, the activity of the catalyst always increases during the first few hours after installation; this activity then decreases with prolonged use. After several days of use, the catalytic charge must be renewed. It is known that these microporous catalysts, which are adsorbent, have a purifying effect on the work solution, but have a strong tendency to clog up.

The renewal of these catalyst charges presents several problems to the manufacturer. These consist principally of the purchase of a new catalyst, which represents an important part of the operational cost, and the disposal of the used catalyst, which is impregnated with organic matter, particularly toxic phenols, which prevents it simply being dumped or discharged because of the risk of polluting water and the environment. Thus spent catalyst cannot be disposed of without preliminary detoxification treatment. The only simple and effective treatment hitherto has been combustion of the spent catalyst in air, resulting in an inert residue. However, combustion of the microporous catalysts used in these cycles for the production of hydrogen peroxide is not entirely satisfactory, for the major part of the organic material impregnated in the catalyst starts to distil when heated to between 280° and 500° C., causing an abundant yellow aerosol to form which is unpleasant and toxic.

Finally, if one considers that these catalysts contain 75 to 90% inorganic residue, it will be appreciated that they can not be considered as fuels with an acceptable calorific or economic value, and their disposal by specialist industrial waste disposal techniques has an unfavorable influence on the economics of producing hydrogen peroxide.

In 1962, in French Pat. No. 1,304,901 a process for the reactivation of conversion catalysts was proposed. According to this process, the catalyst, constituted by an aluminosilicate of sodium, is first of all washed with an appropriate solvent at 80° C., then the solvent is removed by treating the catalyst with a current of steam at 130° C.; the catalyst is then heated, preferably to between 400° and 450° C. in the presence of air for longer than an hour, more preferably for 8 to 12 hours. The conversion catalyst, regenerated under these conditions, shows interesting catalytic activity compared to virgin catalyst. However, catalyst treated by this process contains carbon residues and reduction products such as sulphides, which are undesirable when the catalyst is used in the production of hydrogen peroxide. For example, the sulphides tend to be carried over and inhibit the activity of the catalyst used in the hydrogenation phase of the process, this catalyst usually being prepared from Group VIII metals such as nickel and palladium.

SUMMARY OF THE INVENTION

I have now developed a process which regenerates the conversion catalyst on an industrial scale under particularly advantageous technical, economic, ecological and safe conditions.

The new process leads to the elimination of carbon residues in the regenerated catalyst and to the transformation of sulphides into sulphates which do not have any effect on the activity of the hydrogenation catalyst. My new regeneration process has the notable advantage of completely destroying the toxic matter impregnated on the used catalyst by liberating non-pollutant vapors.

The main interest of the invention lies in the transformation of pollutant waste into a re-usable product with 70–80% of the catalytic activity of new product; these results remain practically constant, even after multiple cycles of regeneration and re-use.

Accordingly, the present invention provides a process for the regeneration of aluminosilicate catalysts used in a cyclical process for the production of hydrogen peroxide by thermal treatment, wherein the catalyst to be treated is subjected to gradual heating up to a maximum temperature in the range from 700° to 850° C., in the presence of an oxidizing atmosphere circulating co-current to the catalyst to be regenerated.

The oxidizing atmosphere can be air, oxygen-enriched air, or oxygen.

This thermal treatment is effective if carried out for a time of at least 15 minutes, preferably between 30 minutes and two hours.

The invention also provides apparatus for carrying out the process defined above, which apparatus comprises a rotary furnace which is inclined to the horizontal by 0.7° to 1°, and has radial fins on the lower part of the interior wall downstream of the inlet.

DESCRIPTION OF THE PREFERRED EMBODIMENTS

It is advantageous to introduce the catalyst to be regenerated into a furnace or circuit whose temperature is between 650° and 700° C., then progressively to heat it to a temperature which can reach 850° C.

The catalytic activity of the catalyst is preserved, despite considerable modification of its microstructure, and the regenerated product can be re-used normally in the conversion circuit, subjected to a second regeneration carried out under the same conditions as the first, again reintroduced into the conversion circuit, and then regenerated many more times. The performance of the regenerated catalyst remains constant after several cycles of regeneration and re-use. The process of the invention can advantageously be carried out in equipment of the rotary furnace type.

The accompanying drawing illustrates one form of apparatus useful for effecting the process of this invention.

Referring to the drawing, a rotary furnace 1 with a rolling track 2A and 2B is equipped with a heating chamber 3 which may be 2.50 meters long, for example, and is heated by four rows of propane gas burners 4, supplied by a piping system 5; two rows of burners are arranged above the furnace and two below. For clarity, only the lower burners are shown in the drawing. The regulation of the gas flow upstream and downstream of the distribution point is independent so that each burner can be individually controlled. The combustion gases escape at 6 from the upper part of the chamber. Fresh air and the catalyst 7 to be regenerated are introduced at the upper part of the furnace at 8 and 9 respectively.

Downstream of the rotary furnace 1 is a receiving chamber 10 provided in its upper part with a chimney 11 for emission of the combustion gases and for encouraging the circulation of air within the rotary furnace. The lower part of chamber 10 is a pipe 12 leading to the outlet for the treated catalyst. The regenerated catalyst passes through line 13 into a revolving tube 14, which is cooled by water. The openings of the furnace 1 and the chimney 11 are provided with shutters to control the admission of air; these shutters are conventional in the art and for convenience are not shown in the drawing.

The rotary furnace is, in use, inclined to the horizontal by 0.7° to 1°, so as to assure the circulation of the catalyst. At the outlet of the furnace, or at its lowest extremity, there is a diaphragm or adjustable retaining flange 15 intended to regulate the residence time of the catalyst in the furnace, retaining a more or less considerable mass within the furnace. In continuous operation, the regulation of the diaphragm can advantageously be such that the furnace retains from 25 to 30 liters of powder.

On the interior wall of the furnace, at the lower, downstream end, the furnace is provided with radial fins 16 to encourage contact between the catalyst and air circulating in the furnace. For example, six radial fins 16 each of a height of 50 mm may be arranged over a length of 1.5 m. When the furnace is rotated (preferably at about six rotations per minute), these fins fluidize and aerate the catalyst powder to improve its oxidization by hot gases.

The temperatures in the heating chamber 3, in the downstream part of furnace 1 and in the receiving chamber 10 are controlled by thermocouples 17, 18 and 19, respectively.

In regular continuous operation, the evaporation of water and organic matter in the upstream part of the furnace requires a considerable calorific input; downstream the highly exothermic combustion of the generated gases and the roasting of the powder enable the external calorific input to be greatly reduced. Above 700° C., combustion of the gases takes place within the furnace and colorless non-pollutant combustion products are discharged through chimney 11.

The process of the invention has been applied with notable success to the regeneration of a gel of hydrated sodium aluminosilicate having an $Al_2O_3$ content of between 55 and 63% of the dry product, and obtained commercially under the name "HAS 1". Its residual humidity, obtained by drying the product for 6 hours at 120° C., is less than 10% by weight, and it comprises spherules of 0.08 to 0.4 mm in diameter. The apparent density of the dried product is in the range 0.6 to 0.8 $g/cm^3$.

The catalytic activity of the new and the regenerated product has been determined by the following method: 50 g of catalyst is introduced into a small heated column of stainless steel. A work solution from a production cycle for $H_2O_2$ using anthraquinone is circulated over the catalyst at a flow rate of 0.25 l/hr in an open circuit for a period of 4 to 8 hours at 140°–145° C. and at a pressure of 4 bars. With two columns placed in parallel and supplied with the same work solution, it is possible to compare two different catalysts directly. The active quinones present in the work solution entering and leave each column are estimated by polarography; the increase in these quinones represents the conversion on passing over the catalyst. This analysis can be effected at any time but it is preferable to obtain an overall average result after a run of 4 to 8 hours, which is more reliable than an instant sample.

Thus, operating on two columns, one containing virgin catalyst and the other regenerated catalyst, the increase in quinone concentration obtained with the regenerated catalyst compared to the increase obtained with the new catalyst represents the degree of catalytic regeneration obtained. It is this ratio, expressed as %, that will be referred to in later examples.

The specific surface of the catalyst has been measured by the Brunner-Emmett-Teller method (B.E.T). The tested catalyst is a gel of alkaline aluminosilicate, in particular of sodium, known as "HAS 1"; this used catalyst contains a high proportion of water and of organic matter which vaporize progressively when the product is heated. A sample of about 5 g of HAS 1, heated at different temperatures in an atmosphere of nitrogen, allows the weight loss of the sample to be determined. The sample is held for 40 minutes at each temperature level, cooled, and then weighed. The results are given in the table below.

| Temperature | Cumulative loss in weight |
| --- | --- |
| 120° C. | 22% |
| 275° C. | 23% |
| 530° C. | 35.6% |

This shows that the greatest part of the loss in weight (22%) occurs between room temperature and 120° C.; the weight loss is small (1%) between 120° and 275° C.; and it is 12.6% between 275° and 530° C. After this test, the catalyst was blackened by the presence of the residual carbon resulting from the cracking of slightly volatile organic substances. The same sample of HAS 1, heated further in air to 530° C. until $CO_2$ disappears from the gases issuing from furnace, shows a further weight loss of 1.4%. Thus volatile substances constituted 37% by weight of the used catalyst HAS 1.

The invention will be further illustrated by the following Examples, without limitation, which show that the catalytic activity of the regenerated HAS 1 depends on the temperature of the regeneration, on the time of contact and also on the nature of the heating process to which the used HAS 1 is subjected.

EXAMPLE 1

Three combustion experiments were carried out in a laboratory muffle furnace with circulation of air by natural convection, the flow of air being co-current with respect to the direction of movement of the catalyst. The same sample of "HAS 1" catalyst as that used to measure the residual amount of organic matter was used for these experiments.

1. With the furnace at 470° C., 100 g of used catalyst was introduced, arranged in layers 10 to 15 mm thick in a metallic tray (nickel or stainless steel). The furnace was closed; during the first 20 minutes a discharge of steam then of organic aerosol was observed. After 15 hours at 470° C., the product was discharged; it had a grey appearance, showing the presence of unoxidized carbon. The catalyst was then cooled, and its activity measured according to the previously described test.

2. With the furnace at 650° C., the above experiment was carried out again with a new charge of used catalyst. The discharge of water vapor and organic vapors only lasted a few minutes. After 3 hours at 650° C., the catalyst was white; it was discharged, cooled and tested for activity in the same manner as the first sample.

3. With the furnace at 800° C., a further charge of the same used catalyst was admitted to the furnace and retained for 2 hours. After this treatment, the catalyst was white; it was discharged, cooled and tested for activity in the same manner as the other samples.

Taking the catalytic activity of virgin catalyst (HAS 1) measured in the laboratory as the reference (100%), the activities of the regenerated catalysts were as follows:

Temperature of regeneration: 470° C. 650° C. 800° C.
Catalytic activity: 62.8% 64.0% 71.5%

Thus, roasting in the presence of air for 2 hours at 800° C. gives a more active product than a catalyst regenerated at 470° C. for 15 hours, the latter providing a product containing carbon. This carbon is still present after 24 hours of roasting at 470° C.

EXAMPLE 2

A small vertical laboratory furnace for the study of the continuous roasting of pulverized minerals in a fluidized bed was used. The supply (in the upper part) and the extraction (at the base of the furnace) of the powder was carried out continuously by an archimedes screw arrangement.

The furnace was first of all preheated to the chosen temperature, then fed continuously with catalyst particles. After operating for about 2 hours, the issuing product was representative of continuous operation.

Three tests were carried out, each involving the same contact time of about one hour, and at three different temperatures, viz. 650°, 740° and 800° C. The roasted particles were tested for activity: none of the three samples tested had a catalytic activity greater than 23%.

This experiment indicates, therefore, that if the individual grains of the catalyst are suddenly raised to a high temperature by projection into a very hot gas, these grains lose almost all their catalytic activity.

EXAMPLE 3

In a rotary furnace of a semi-industrial size (diameter 300 mm) made of refractory stainless steel of the type previously described, approximately 2000 kg of used catalyst of the "HAS 1" type described above were regenerated to obtain about 1300 to 1500 kg of the regenerated product. Once the furnace had been put into rotation, it was preheated to 650°–700° C. The used catalyst was then introduced continuously, at the rate of 25 kg. per hour. The furnace was held at an angle of 0.7° to 1° from the horizontal, and air was allowed to pass over the catalyst particles in a flow direction the same as that of the particles themselves. The increase in temperature was continued so that the issuing product (the regenerated powder situated just behind the outlet diaphragm) was at 800°–830° C. With an input at a rate of 25 kg per hour, the residence time of the catalyst in the furnace was from 50 to 60 minutes; the issuing product was white after it had been cooled.

When applying the catalytic conversion test already described on an average sample of 1,350 kg of regenerated catalyst, an activity equal to 76% of that of the virgin product was found. Installed in the industrial cycle for production of hydrogen peroxide, this catalyst acted practically as a new catalyst, without presenting any secondary or abnormal effects in the production cycle.

Identical measurements of structure and porosity were carried out on the regenerated catalyst in comparison with the same type of new catalyst. Before carrying out these measurements, the products were first placed in ampoules and subjected to a flow of nitrogen at 150° C. for 15 hours. The results are given in the following table; (1 nm = 1 nanometer = 10 A)

| Catalyst | Surface BET $m^2/g$ (Pores 0.8 nm) | Microporosity 4 nm Surface $m^2/g$ | Average porosity 4 to 25 nm Surface $m^2/g$ |
|---|---|---|---|
| New | 263 | 243 | 20 |
| Regenerated | 97 | 51 | 46 |

It is remarkable that the regenerated product still has 76% catalytic activity while its specific surface is no more than 37% of that of the new product.

EXAMPLE 4

The regenerated catalyst obtained by the process as set out in Example 3 above was used in an industrial $H_2O_2$ production cycle, and was withdrawn after 15 days service. A sample of this used catalyst was regenerated a second time at 800° C. in a laboratory muffle furnace under identical conditions to those of Example 1. This regenerated sample had a catalytic activity of 75% with reference to that of the new product. It appears therefore, that the catalyst, having undergone a second regeneration, shows a catalytic activity equal to that of the catalyst which had been regenerated only once. It seems therefore, according to these examples, that the activity of the catalyst is independent of the number of regenerations it has undergone. The successive regenerations of the "HAS 1" catalyst by the process of this invention thus permit a significant economy to be obtained in the manufacturing cost of hydrogen peroxide.

What is claimed is:

1. A process for the regeneration of aluminosilicate catalyst, comprising a gel of hydrated sodium aluminosilicate having an $Al_2O_3$ content of 55–63%, used in a cyclical process for the production of hydrogen peroxide by thermal treatment, comprising:

introducing the catalyst to be regenerated into a thermal enclosure at 650°–700° C. and progressively heating the catalyst in the thermal enclosure for 30 minutes to 2 hours by gradually increasing the temperature to a maximum temperature within the range of 700°–850° C. in the presence of a circulating oxidizing atmosphere.

2. A process according to claim 1, wherein the catalyst is an aluminosilicate of sodium.

3. A process according to claim 1, wherein the thermal enclosure is a rotary furnace which is inclined to the horizontal by 0.7° to 1°.

4. A process in accordance with claim 1 wherein the catalyst is continuously passed through said thermal enclosure and subjected to said progressive heating, and wherein the oxidizing atmosphere circulates cocurrently with the direction of movement of the catalyst.

5. A process in accordance with claim 1, further including the step of re-using the regenerated catalyst, obtained as a result of said introducing and heating step, in the process for the production of hydrogen peroxide and repeating said introducing and heating step and said re-using step.

6. A process in accordance with claim 1 wherein said oxidizing atmosphere is air, oxygen-enriched air or oxygen.

7. A process in accordance with claim 1 wherein the oxidizing atmosphere is at ambient temperature when admitted to the thermal enclosure.

8. A process in accordance with one of claims 1 or 4 wherein said oxidizing atmosphere is fresh air.

9. A process in accordance with claim 1 wherein said gradual heating is from a temperature of about 650°–700° C. to a temperature of about 800°–830° C.

* * * * *